W. FAVREAU.
EDUCATIONAL AND ENTERTAINING DEVICE.
APPLICATION FILED OCT. 11, 1920.

1,405,193.  Patented Jan. 31, 1922.
2 SHEETS—SHEET 1.

Inventor
Walter Favreau
By his Attorney
A. H. de Bonneville

W. FAVREAU.
EDUCATIONAL AND ENTERTAINING DEVICE.
APPLICATION FILED OCT. 11, 1920.
1,405,193.
Patented Jan. 31, 1922.
2 SHEETS—SHEET 2.
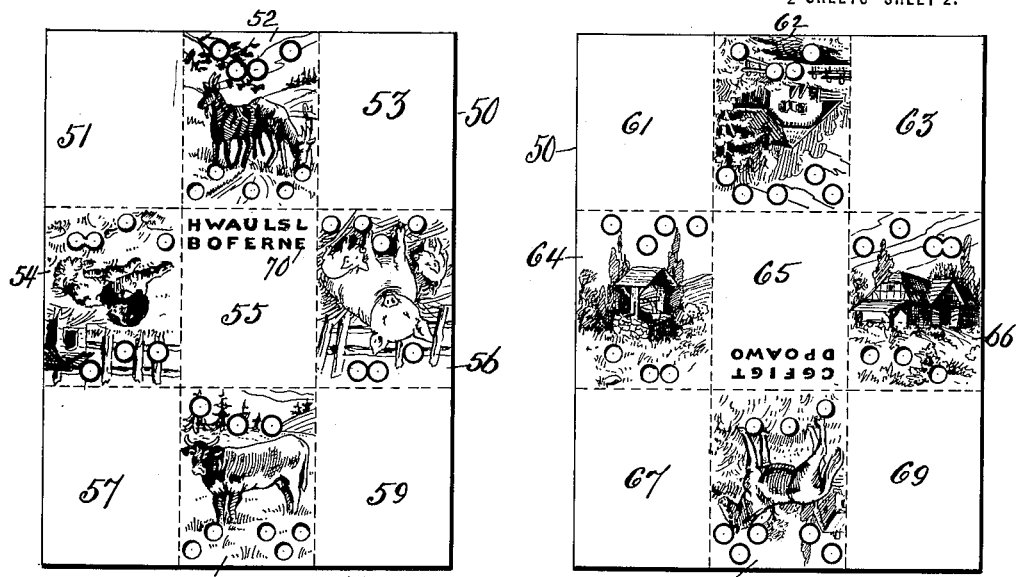
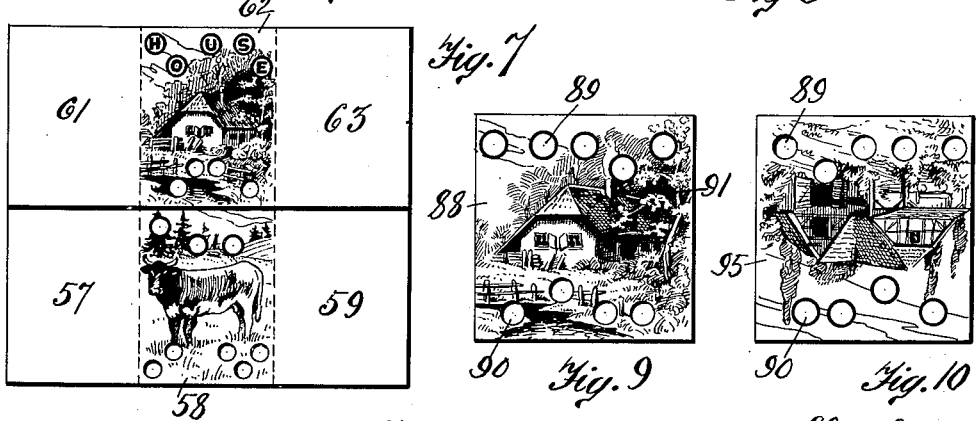
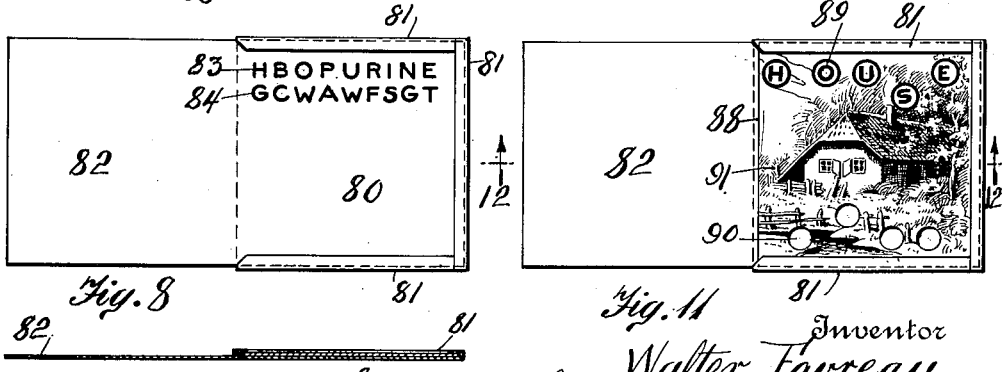
Inventor
Walter Favreau
By his Attorney
N A de Bonneville

UNITED STATES PATENT OFFICE.

WALTER FAVREAU, OF NEW YORK, N. Y.

EDUCATIONAL AND ENTERTAINING DEVICE.

1,405,193.  Specification of Letters Patent.  Patented Jan. 31, 1922.

Application filed October 11, 1920. Serial No. 416,181.

*To all whom it may concern:*

Be it known that I, WALTER FAVREAU, a citizen of the Republic of Germany, and resident of the borough of Richmond, city of New York, in the county of Richmond and State of New York, have invented certain new and useful Improvements in an Educational and Entertaining Device of which the following is a specification.

This invention relates to an improvement in teaching reading and mathematics, by means of an educational and entertaining device.

The object of the invention contemplates a device with one or a plurality of leaves or pages, each having a pictorial representation thereon and sight holes therein, and sometimes also with mathematical indications or problems thereon, and which I will hereinafter designate as the pictorial pages. The device also contains one or a plurality of leaves or pages, each with letters preferably in rows of two in a predetermined order and mathematical characters preferably in rows of two in regular order. These latter leaves or pages I will hereinafter designate as the alphabetical pages.

In this application the invention is shown in various forms which will be fully described.

Figure 1:
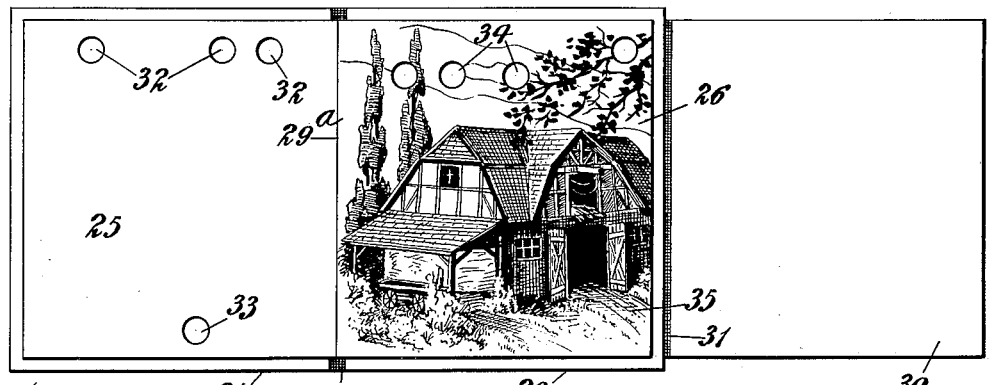
Figure 2:
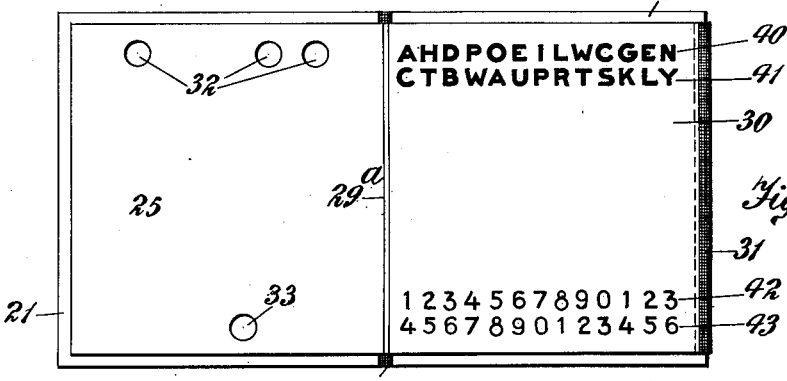
Figure 3:
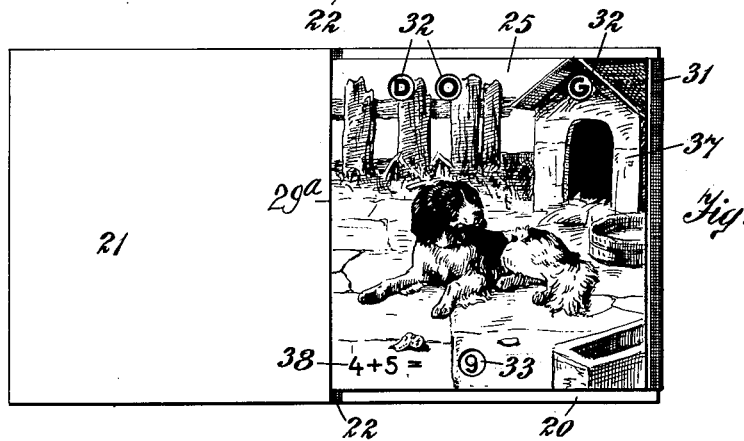
Figure 4:
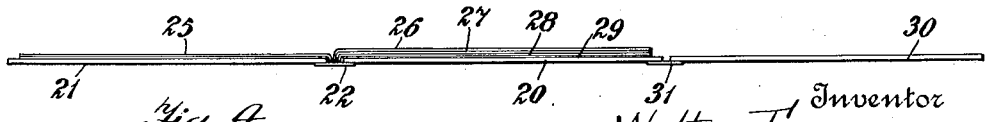

In the accompanying drawings Fig. 1 shows an inside plan view of the device, in book form, with one of its pictorial pages in sight; Fig. 2 shows a view similar to Fig. 1 with its alphabetical page folded over the pictorial page of Fig. 1; Fig. 3 is a view similar to Fig. 2 with a pictorial page folded over the alphabetical page of Fig 2; Fig. 4 shows a bottom end view of the device in its open position; Fig. 5 represents the device on one leaf or page; Fig. 6 is a back or rear view of Fig. 5; Fig. 7 is a view similar to Fig. 5 with a portion thereof folded over its front side; Fig. 8 represents an open envelope for another form of the device; Figs. 9 and 10 show pictorial pages; Fig. 11 shows the envelope of Fig. 8 with a pictorial page inserted therein and Fig. 12 is a section of Fig. 11 on the line 12, 12.

Referring to Figs. 1 and 4, a book is indicated with a cover having the members 20 and 21 connected by the flexible hinge portion 22 constituting the back of the book. A plurality of pictorial pages 25 to 29 have each one edge 29ª connected to the hinge portion 22 in the usual way. To the outer edge of the member 20 of the cover is hinged the alphabetical page 30 by means of the flexible hinge portion 31. Each of the pictorial pages 25 to 29 has formed therein sight holes, which on page 25 are indicated at 32 and 33 and on page 26 at 34. A pictorial representation 35 of a barn is indicated on page 26, while a pictorial representation 37 of a dog, with a mathematical problem 38, is indicated on page 25.

The alphabetical page 30 has formed thereon the rows of letters 40 and 41 which are each placed in a predetermined sequence, and the rows of numerals 42 and 43 in regular order.

To use the device shown in Figs. 1 to 4 the operator opens the book as indicated in Fig. 1 and then selects one of the pictorial pages like 25 and folds it to the left as indicated in Figs. 1 and 2. Next the alphabetical page 30 is also folded to left as indicated in Fig. 2 which brings its rows of letters 40 and 41 and its rows of numerals 42 and 43 in sight. Then the pictorial page 25 is folded over the page 30 and thereby the sight holes 32 are located over the correct letters of page 30, to spell in this instance the word dog, the picture of which is shown on the page. At the same time the sight hole 33 falls over the numeral 9 which indicates the sum of the numerals 4 and 5 indicated on the page 25. It will be noted that the user does not have to search for the letters that spell the word dog and does not have to find the number 9 to add the numerals to find the sum of 4 and 5.

Referring to Figs. 5, 6 and 7, a leaf 50 has its front side divided into nine sections indicated at 51 to 59 and its rear side into nine sections indicated at 61 to 69. The sections 52, 54, 56, 58, 62, 64, 66 and 68, in this instance, constitute the pictorial pages and the sections 55 and 65 constitute the alphabetical pages. In Fig. 7 is indicated a method of using this form of the device, and in which the sections 51, 52, 53 are folded over the sections 54, 55 and 56 which brings into view the sections 61, 62 and 63, and the sight holes in section 62 are located over the alphabet 70 of section 55, spelling the word house which is pictorially represented on said section 62. In the same manner all of the various pictorial pages on one side of the leaf are spelled with its sight holes on the alphabetical page on the other side of the leaf.

Referring to Figs. 8, 9, 10, 11 and 12, an envelope is shown with the pocket 80 having the stationary flaps 81 and the folding flap 82. On the inner face of the pocket 80 are indicated a couple of rows of letters 83, 84 in predetermined sequence and which face constitutes the alphabetical page of the device. Fig. 9 shows the pictorial page 88 with the sight holes 89 and 90 and the picture 91 Fig. 10 indicates the rear face of the page 88 with said sight holes 89 and 90 and the picture 95. With the form of the device indicated in Figs. 9 to 12 when not in use all the pictorial pages like 88 are maintained in the pocket 80 under the flaps 81 and the flap 82 is folded under said flaps 81. When this last form of device is to be used the flap 82 is unfolded from the pocket 80 and the pictorial pages are placed therein one at a time, over the alphabet having the rows of letters 83 and 84. In this instance, as indicated in Fig. 11, the page 88 is placed in the pocket 80 and the sight holes 89 spell the word house which is pictorially indicated on the page.

In all the forms of the device each of the letters of the words spelled are indicated through a sight hole. The combination of the letters through the plurality of sight holes, without any effort on the part of the user to select the proper sight holes, indicate the proper spelling of the pictoral representation. The letters are spaced apart, sometimes on different lines to exercise the inquisitive faculty of the child using the device. The sight holes for the mathematical problem also indicate the answer without any exertion of the user.

It is to be understood that this invention may be modified in various ways without departing from its spirit and this exemplification thereof is indicative and not limitative.

Having described my invention what I desire to secure by Letters Patent and claim is:

1. In a device the combination of an alphabetical page and a pictoral page with sight holes spaced apart in predetermined locations, the pictorial page when located on the alphabetical page bringing into view through each sight hole a letter, the combination of letters producing a word descriptive of the pictorial page.

2. In a device the combination of a page having letters and numerals thereon and a second page having sight holes therein, a picture and a mathematical problem thereon, the second page when located on the first page, enabling each of some of said sight holes to bring into view a letter, the combination of letters spelling a description of said picture and one of said sight holes indicating a solution of said problem.

3. A device in the form of a book having pictorial pages with sight holes therein and a problem thereon an additional page with letters and numerals thereon, any of the pictorial pages adapted to be located on the additional page, each of said sight holes thereby bringing into view one of said letters, the combination of letters producing a word descriptive of the pictorial page located on the additional page, and one of said sight holes bringing into view a numeral which is the answer to said problem.

4. In a device of the character described the combination of the members of the cover of a book, a hinge portion constituting the back of the book connecting said members, pictorial pages having sight holes with one edge of each connected to said hinge portion and an alphabetical page hinged to one of the outer edges of one of the members of said cover, each of said pictorial pages adapted to be folded on the alphabetical page, the sight holes of the pictorial pages arranged to uncover letters on the alphabetical page to describe the pictures on the pictorial pages.

Signed at the borough of Manhattan, city of New York, in the county of New York and State of New York, this 6th day of October, A. D. 1920.

WALTER FAVREAU.